US011037325B2

(12) United States Patent
Tomioka et al.

(10) Patent No.: US 11,037,325 B2
(45) Date of Patent: Jun. 15, 2021

(54) INFORMATION PROCESSING APPARATUS AND METHOD OF CONTROLLING THE SAME

(71) Applicant: CANON KABUSHIKI KAISHA, Tokyo (JP)

(72) Inventors: Makoto Tomioka, Kawasaki (JP); Daisuke Kotake, Yokohama (JP); Nozomu Kasuya, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/779,997

(22) Filed: Feb. 3, 2020

(65) Prior Publication Data
US 2020/0175717 A1 Jun. 4, 2020

Related U.S. Application Data

(63) Continuation of application No. 15/861,764, filed on Jan. 4, 2018.

(30) Foreign Application Priority Data

Jan. 6, 2017 (JP) .............................. JP2017-001435
Nov. 8, 2017 (JP) .............................. JP2017-215899

(51) Int. Cl.
*G06T 7/73* (2017.01)
*G06T 7/55* (2017.01)
(Continued)

(52) U.S. Cl.
CPC ............ *G06T 7/73* (2017.01); *G06K 9/00664* (2013.01); *G06K 9/46* (2013.01); *G06K 9/6201* (2013.01);
(Continued)

(58) Field of Classification Search
CPC .... G06T 7/73; G06T 7/55; G06T 7/60; G06T 7/70; G06T 7/246–248; G06T 7/62;
(Continued)

(56) References Cited

U.S. PATENT DOCUMENTS 7,782,361 B2 * 8/2010 Kotake ................... G06T 7/73
348/207.99
8,144,238 B2 3/2012 Kotake
(Continued)

FOREIGN PATENT DOCUMENTS

JP        5530391 B2      6/2014
JP     2016091065 A      5/2016

OTHER PUBLICATIONS

Notice of Allowance issued in U.S. Appl. No. 15/861,764 dated Nov. 12, 2020.
(Continued)

*Primary Examiner* — Michael S Osinski
(74) *Attorney, Agent, or Firm* — Rossi, Kimms & McDowell LLP

(57) ABSTRACT

An information processing apparatus has a hold unit for holding a plurality of features of a physical space as a plurality of held features, each of the plurality of held features being related with a position in a first image captured by an image capturing apparatus at a first time, and information of an availability for a position/orientation calculation of the image capturing apparatus. The information processing apparatus associates a plurality of detected features, which are detected in a second image captured by the image capturing apparatus at a second time after the first time, with the plurality of held features, and, based on the availabilities related with the associated held features, adjusts a detected feature, among the plurality of detected
(Continued)

features, to be used in the calculation of the position/orientation of the image capturing apparatus.

10 Claims, 10 Drawing Sheets

(51) Int. Cl.
| | | |
|---|---|---|
| *G06T 7/60* | (2017.01) | |
| *G06K 9/46* | (2006.01) | |
| *G06K 9/00* | (2006.01) | |
| *G06K 9/62* | (2006.01) | |
| *G06K 9/20* | (2006.01) | |

(52) U.S. Cl.
CPC .................. *G06T 7/55* (2017.01); *G06T 7/60* (2013.01); *G06K 9/00671* (2013.01); *G06K 9/209* (2013.01); *G06T 2207/10021* (2013.01); *G06T 2207/10024* (2013.01); *G06T 2207/10028* (2013.01); *G06T 2207/30244* (2013.01)

(58) Field of Classification Search
CPC ........... G06T 7/20; G06T 7/215; G06T 7/223; G06T 2207/30244; G06T 2207/10028; G06T 2207/10016; G06T 2207/30204; G06K 9/00664; G06K 9/00671; G06K 9/46; G06K 9/6201; G06K 9/209; G06K 9/00711; G06K 9/00771; G06K 9/00785; H04N 19/139; H04N 19/159; H04N 19/176; H04N 19/521; H04N 13/221; H04N 13/264
See application file for complete search history.

(56) References Cited

U.S. PATENT DOCUMENTS

| | | | |
|---|---|---|---|
| 8,401,225 B2 | 3/2013 | Newcombe | |
| 8,842,163 B2 | 9/2014 | Datta | |
| 8,953,847 B2 | 2/2015 | Moden | |
| 8,965,133 B2 | 2/2015 | Shiiyama | |
| 9,525,862 B2 | 12/2016 | Benhimane | |
| 9,652,861 B2 | 5/2017 | Yamaguchi | |
| 9,852,341 B2 | 12/2017 | Zhou | |
| 9,964,955 B2 | 5/2018 | Keivan | |
| 10,026,155 B1 | 7/2018 | Furukawa | |
| 10,055,013 B2 | 8/2018 | Ramaswamy | |
| 10,095,928 B2 | 10/2018 | Beall | |
| 10,347,001 B2 | 7/2019 | Murphy-Chutorian | |
| 2007/0140529 A1 | 6/2007 | Iwabuchi | |
| 2010/0150462 A1* | 6/2010 | Okada | H04N 19/80 382/236 |
| 2012/0281922 A1 | 11/2012 | Yamada | |
| 2012/0314765 A1* | 12/2012 | Omori | H04N 19/142 375/240.08 |
| 2013/0094713 A1 | 4/2013 | Nanri | |
| 2013/0136184 A1 | 5/2013 | Suzuki | |
| 2013/0294681 A1 | 11/2013 | Nishimura | |
| 2014/0139674 A1 | 5/2014 | Aoki | |
| 2014/0320682 A1 | 10/2014 | Kuwabara | |
| 2015/0243016 A1 | 8/2015 | Moteki | |
| 2015/0310624 A1 | 10/2015 | Bulan | |
| 2017/0061641 A1 | 3/2017 | Inoue | |
| 2017/0148175 A1 | 5/2017 | Liu | |
| 2017/0177939 A1 | 6/2017 | Beall | |
| 2018/0084274 A1 | 3/2018 | Furukawa | |
| 2018/0095347 A1 | 4/2018 | Takahashi | |
| 2018/0095549 A1 | 4/2018 | Watanabe | |
| 2018/0197307 A1 | 7/2018 | Tomioka | |
| 2018/0197308 A1 | 7/2018 | Kasuya | |
| 2018/0262754 A1 | 9/2018 | Komi | |
| 2018/0336688 A1 | 11/2018 | Narita | |
| 2018/0339386 A1 | 11/2018 | Lee | |
| 2019/0052806 A1 | 2/2019 | Wada | |
| 2019/0080466 A1 | 3/2019 | Mori | |
| 2019/0122370 A1 | 4/2019 | Hayashi | |
| 2019/0155302 A1 | 5/2019 | Lukierski | |
| 2019/0230360 A1 | 7/2019 | Koyama | |
| 2020/0250846 A1* | 8/2020 | Oka | G01C 3/14 |

OTHER PUBLICATIONS

Zhang. "A Flexible New Technique for Camera Calibration." IEEE Transactions on Pattern Analysis and Machine Intelligence. 2000: 1-21. vol. 22, No. 11.

Kato et al. "Marker Tracking and HMD Calibration for a Video-Based Augmented Reality Conferencing System." Faculty of Information Sciences, Hiroshima City University. Human Interface Technology Laboratory, University of Washington. 1999.

Shi et al. "Good Features to Track." IEEE Conference on Computer Vision and Pattern Recognition. Jun. 1994. Seattle.

Badino et al. "A Head-Wearable Short-Baseline Stereo System for the Simultaneous Estimation of Structure and Motion." 12th IAPR Conference on Machine Vision Applications. Jun. 13-15, 2011. Nara, Japan.

Klein et al. "Parallel Tracking and Mapping for Small AR Workspaces." Active Vision Laboratory, Department of Engineering Science, University of Oxford. 2007.

Kotake et al. "A Fast Initialization Method for Edge-based Registration Using an Inclination Constraint." ISMAR. IEEE Xplore. Dec. 2007.

Korkalo et al. "Real-time depth camera tracking with CAD models and ICP." Journal of Virtual Reality and Broadcasting. 2016. vol. 13, No. 1.

Lowe. "Distinctive Image Features from Scale-Invariant Keypoints." International Journal of Computer Vision. Jan. 5, 2004: 1-28.

Tomasi et al. "Detection and Tracking of Point Features." Technical Report CMU-CS-91-132. Apr. 1991: 1-20.

Long et al. "Fully Convolutional Networks for Semantic Segmentation." IEEE Transaction on Pattern Analysis and Machine Intelligence, vol. 39, pp. 640-651, 2017.

Notice of Allowance issued in U.S. Appl. No. 15/861,764 dated Nov. 8, 2019.

Notice of Allowance issued in U.S. Appl. No. 15/861,800 dated Nov. 6, 2019.

Notice of Allowance issued in U.S. Appl. No. 15/861,800 dated Jan. 30, 2020.

Notice of Allowance issued in U.S. Appl. No. 15/861,764 dated Feb. 3, 2020.

Notice of Allowance issued in U.S. Appl. No. 15/861,764 dated May 4, 2020.

Notice of Allowance issued in U.S. Appl. No. 15/861,800 dated May 5, 2020.

Notice of Allowance issued in U.S. Appl. No. 15/861,764 dated Aug. 10, 2020.

Notice of Allowance issued in U.S. Appl. No. 15/861,800 dated Aug. 12, 2020.

Office Action issued in Japanese Appln. No. 2017-001434 dated Feb. 15, 2021.

* cited by examiner

FIG. 2

| | | GEOMETRIC ATTRIBUTE | AVAILABILITY INFORMATION |
|---|---|---|---|
| FEATURE POINTS | 1 | (10,25) | 0.2 |
| | ... | ... | ... |
| | M | (12,41) | 0.9 |

141

INFORMATION PROCESSING APPARATUS AND METHOD OF CONTROLLING THE SAME

BACKGROUND OF THE INVENTION

Field of the Invention

The present invention relates to an information processing apparatus for measuring a position/orientation of an image capturing apparatus and a method of controlling the same.

Description of the Related Art

Measurement of the position and/or orientation of an image capturing apparatus based on image information is used for various purposes such as alignment of a virtual object with a physical space in a mixed reality/an augmented reality, a self-position estimation of an automobile or a robot, and three-dimensional modeling of an object or a space. A position and/or an orientation is referred to as a position/orientation below.

Japanese Patent No. 5530391 discloses a method of measuring, in a scene where an object that moves exists in a physical space, a position/orientation at a time of image capture by using feature points detected from an image. In this method, it is determined whether a feature point on a three-dimensional map is a feature point on a moving object, and a moving object flag is set to 1 if the feature point is on the moving object. When an image captured by an image capturing apparatus is inputted, feature points in a three-dimensional map corresponding to feature points detected from the captured image are searched for. The position/orientation of the image capturing apparatus is calculated in accordance with a robust estimation that uses all pairs of a feature point on the three-dimensional map where the moving object flag is 0 and the corresponding feature point detected from the captured image. A determination is made for whether a feature point determined to be an outlier at the time of the robust estimation is a moving object by obtaining a movement vector after making a projection onto the captured image based on the calculated position/orientation. The moving object flag of a feature point on the three-dimensional map that has been determined to be a moving object is updated to 1.

In Japanese Patent No. 5530391, there is the possibility that, out of feature points detected from an image captured by an image capturing apparatus, a feature point inappropriate for a position/orientation calculation of a moving object will be mistakenly associated with a feature point whose moving object flag in the three-dimensional map is 0, and used in a position/orientation calculation. As a result, there is a problem in that the precision and stability of the position/orientation is low.

SUMMARY OF THE INVENTION

By virtue of an embodiment of the present invention, precision and stability in calculation of the position/orientation of an image capturing apparatus improves irrespective of the existence of a moving object in a range that the image capturing apparatus captured.

According to one aspect of the present invention, there is provided an information processing apparatus, comprising: a holding unit configured to hold a plurality of features of a physical space as a plurality of held features, each of the plurality of held features being related with a position in a first image captured by an image capturing apparatus at a first time, and information of an availability for a position/orientation calculation of the image capturing apparatus; an associating unit configured to associate a plurality of detected features, which are detected in a second image captured by the image capturing apparatus at a second time after the first time, with the plurality of held features; and a control unit configured to, based on the availabilities related with the associated held features by the associating unit, adjust a detected feature, among the plurality of detected features, to be used in a calculation of a position/orientation of the image capturing apparatus.

Also, according to one aspect of the present invention, there is provided a method of controlling an information processing apparatus having a holding unit operable to hold a plurality of features of a physical space as a plurality of held features, each of the plurality of held features being related with a position in a first image captured by an image capturing apparatus at a first time, and information of an availability for a position/orientation calculation of the image capturing apparatus, the method comprising: associating a plurality of detected features, which are detected in a second image captured by the image capturing apparatus at a second time after the first time, with the plurality of held features; and based on the availabilities related with the associated held features, adjusting a detected feature, among the plurality of detected features, to be used in a calculation of a position/orientation of the image capturing apparatus.

Further features of the present invention will become apparent from the following description of exemplary embodiments (with reference to the attached drawings).

BRIEF DESCRIPTION OF THE DRAWINGS

FIG. 2 is a view illustrating a data structure for an image feature history information hold unit in the first embodiment.

DESCRIPTION OF THE EMBODIMENTS

Figure 1A:
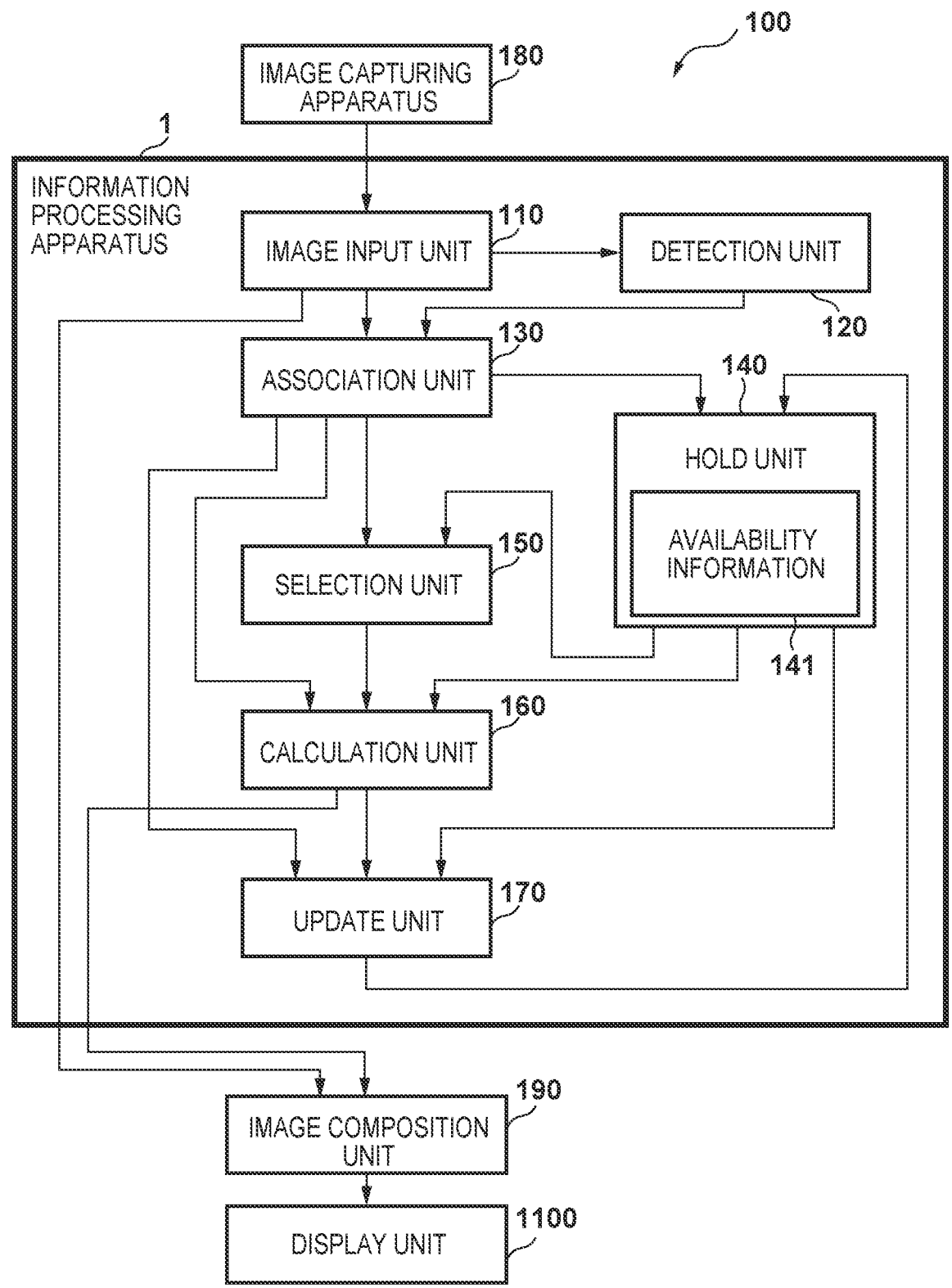
FIG. 1A is a block diagram illustrating an example of a functional configuration of an information processing apparatus in a first embodiment.

Explanation is given below regarding embodiments of the present invention, while referring to the drawings.

First Embodiment

In the first embodiment, explanation is given regarding a configuration for measuring the position/orientation of an image capturing apparatus in a physical space based on an image obtained from the image capturing apparatus. The measured position/orientation of the image capturing apparatus is, for example, used to present a mixed reality to a user by a mixed reality system rendering a virtual object after aligning the virtual object with a physical space. In the configuration of the first embodiment, it is possible to stably and with high precision measure the position/orientation of an image capturing apparatus even if a moving object exists in the physical space. A user who experiences the mixed reality wears a head-mounted display (hereinafter, a HMD (Head-Mounted Display)) to thereby observe through the HMD the physical space onto which virtual objects are superimposed. An image of a virtual object is rendered, based on the position/orientation in the physical space of an image capturing apparatus mounted in the HMD, on an image captured by the image capturing apparatus. The HMD presents an image to the user in which the image of the virtual object has been superimposed on the captured image.

Image features detected from the image captured by the image capturing apparatus are used in the calculation of the position/orientation of the image capturing apparatus. In the present embodiment, a feature point that exists in an image is used as an image feature. A "feature point" is a point that indicates a geometric structure such as a corner or the like in an image. An overview of the calculation of the position/orientation of the image capturing apparatus at a time t is as follows. Firstly, feature points detected in an image captured at the time t (a current frame) are associated with feature points on an image captured at a time t−1 which is before the time t (a previous frame). The position/orientation of the image capturing apparatus in the current frame is then calculated based on the feature points of the previous frame, the two-dimensional positions in the image of the feature points of the current frame, and the position/orientation of the image capturing apparatus in the previous frame. At the time of the calculation of the position/orientation, only feature points for which it is possible to stably and with good precision calculate the position/orientation are selected and used. For each feature point, availability information which is an index indicating whether the stability and the precision will increase or decrease when the feature point is used to calculate the position/orientation is held. In the present embodiment, the availability information is a history of results of determining whether the feature point was a moving object at the time t−1 and before. Specifically, the availability information is an index that indicates a degree of matching for each feature point with respect to movement of the camera based on the calculated position/orientation. By using only feature points that match the movement of the camera at the time t−1 and before, it is possible to stably and with high precision calculate the position/orientation.

The position/orientation of the image capturing apparatus in the first embodiment is six parameters combining three parameters that represent the orientation of the image capturing apparatus, and three parameters that represent the position of the image capturing apparatus in global coordinates defined in the physical space. In the present embodiment, a stereo camera is used as the image capturing apparatus, and unless specified otherwise, the position/orientation of a left-side camera of the stereo camera is referred to as the position/orientation of the image capturing apparatus. In addition, a three-dimensional coordinate system defined with respect to the image capturing apparatus in which the optical axis of the image capturing apparatus is the Z-axis, a horizontal direction of the image is the X axis, and the vertical direction thereof is the Y axis is referred to as a camera coordinate system. In the present embodiment, unless specified otherwise, a feature point indicates a feature point detected in an image of the camera of the left-side, and the position of the feature point is expressed by two parameters that represent a two-dimensional position of an image coordinate system in which abscissa of the image of the left-side camera is the x axis and the ordinate is the y axis. In addition, a moving object in the present embodiment is a hand of a user who experiences the mixed reality, another user, or furniture such as a desk or a chair, for example.

FIG. 1A is a block diagram illustrating an example of a functional configuration of an image processing system 100 in a first embodiment. The image processing system 100 has an information processing apparatus 1, an image capturing apparatus 180, an image composition unit 190, and a display unit 1100. The information processing apparatus 1 is provided with an image input unit 110, a detection unit 120, an association unit 130, a hold unit 140, a selection unit 150, a calculation unit 160, and an update unit 170. The image input unit 110 is connected to the image capturing apparatus 180 which is mounted to the HMD. The image input unit 110 and the calculation unit 160 are connected to the image composition unit 190. The image composition unit 190 is connected to the display unit 1100.

The image input unit 110 obtains images captured by the image capturing apparatus 180 in chronological order (for example, 60 frames a second), and provides the obtained images to the detection unit 120, the association unit 130, and the image composition unit 190. The detection unit 120 detects a feature point on an image inputted from the image input unit 110, and calculates the position of the feature point. The detection unit 120 provides the calculated position of the feature point to the association unit 130. The association unit 130 performs association by searching for an association relationship between a feature point of the previous frame that the hold unit 140 holds as the availability information 141, and the feature point detected by the detection unit 120 from the current frame captured after a time when the previous frame was captured.

The hold unit 140 holds the availability information 141 that associates the geometric attribute of each feature point with an availability for calculation of a position/orientation. The geometric attribute of the feature point is the position of the feature point in the previous frame, for example. Details of the data structure of the availability information 141 are described later. Based on the availability information held by the hold unit 140, the selection unit 150 selects a feature point to use in the calculation of the position/orientation out of feature points detected for the current frame. The calculation unit 160 calculates the position/orientation in the world coordinate system of the image capturing apparatus 180 by using the association relationship found by the association unit 130 between the feature point selected by the selection unit 150 and the feature point of the previous frame held by the hold unit 140. The update unit 170, based on the position/orientation of the image capturing apparatus 180 calculated by the calculation unit 160 and the result of associating the feature points by the association unit 130, updates the availability information 141 held by the hold unit 140.

The image capturing apparatus 180 is a stereo camera, and captures color images of a scene by two left and right cameras that are mounted. The image composition unit 190 renders a CG image of a virtual object by using internal and external parameters of the image capturing apparatus and the position/orientation of the image capturing apparatus 180 calculated by the calculation unit 160. The image composition unit 190 composites an image by superimposing the CG image on the captured stereoscopic image. The display unit 1100 is provided in an HMD 2 (FIG. 1B), and displays the image composited by the image composition unit 190. In the present embodiment the HMD 2 is a stereo HMD, and by displaying different images to left and right display devices enables stereoscopic viewing of a physical space and a virtual object by a user.

Figure 1B:
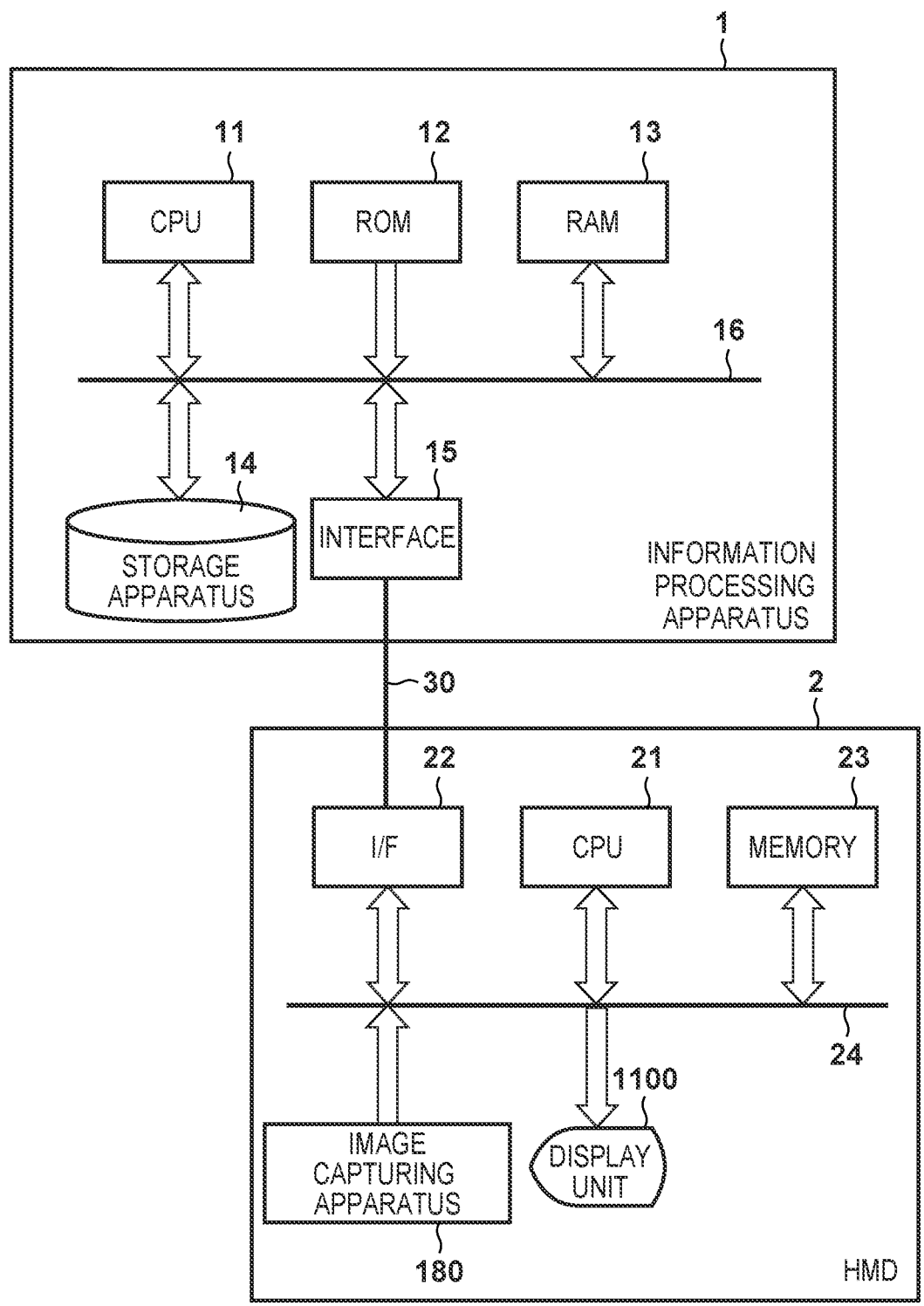
FIG. 1B is a block diagram illustrating an example of a hardware configuration of an information processing apparatus in a first embodiment.

FIG. 1B is a block diagram that illustrates an example of a hardware configuration of the image processing system 100 in the present embodiment. In the information processing apparatus 1, a CPU 11 executes a program stored in a ROM 12 or a RAM 13 to thereby realize functions, various processes, and control of the information processing apparatus 1. The ROM 12 is a read-only non-volatile memory, and the RAM 13 is a volatile memory capable of being dynamically read from or written to. A storage apparatus 14 is a large capacity storage medium such as a hard disk. An interface 15 connects an external device to the information processing apparatus 1. Each of the above configurations are connected so as to allow mutual communication by a bus 16.

Meanwhile, in the HMD 2, a CPU 21 executes a program stored in a memory 23 to thereby realize functions, various processing and control of the HMD 2. An interface 22 connects an external device to the HMD 2. The image capturing apparatus 180 and the display unit 1100 are as explained above in relation to FIG. 1A. Each above unit in the HMD 2 is connected to allow mutual communication via a bus 24. A connection 30 for connecting the interface 15 and the interface 22 may be a wired connection or may be a wireless connection. The connection 30 may be a connection via a wired LAN or a wireless LAN.

Note that, in FIG. 1A, the image input unit 110, the detection unit 120, the calculation unit 160, and the image composition unit 190 are illustrated as configurations (functions) internal to the information processing apparatus 1, but these may be realized by a configuration that is outside of the information processing apparatus 1, such as the HMD 2.

FIG. 2 is a view that illustrates an example of the data structure of the availability information 141 held by the hold unit 140. The geometric attribute and the availability value of each feature point are held in association with each other. In the present embodiment, the geometric attribute of an image feature is two-dimensional coordinates representing the position of a feature point of the previous frame. In addition, the availability is a value calculated based on a result of determining whether the corresponding feature point was a moving object at the time of processing of the previous frame, and is held as the value of a real number between 0 and 1. The availability is a value that approaches 0 as the possibility of being used in the calculation of the position/orientation decreases.

Figure 3:
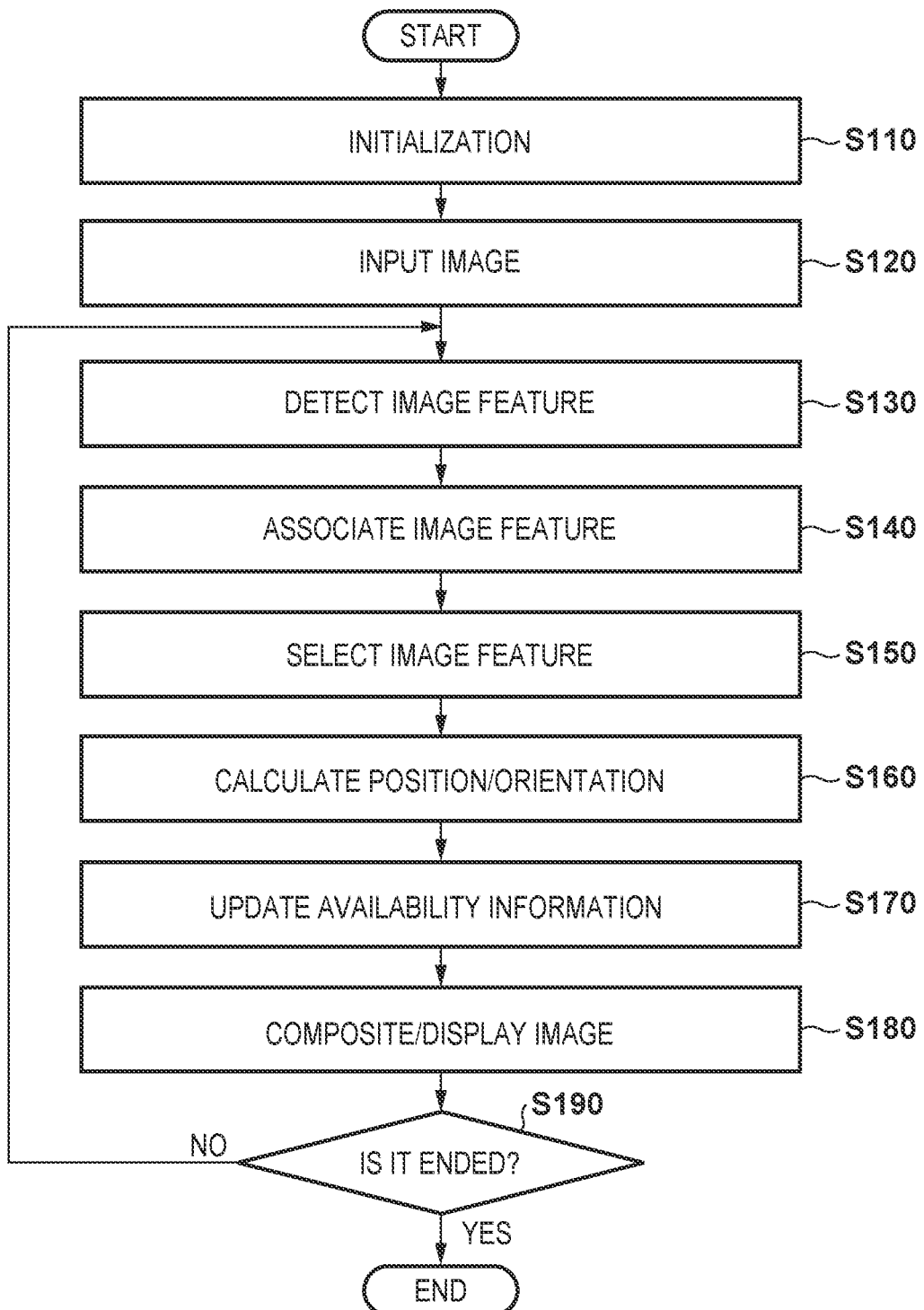
FIG. 3 is a flowchart illustrating a procedure for processing in the first embodiment.

Explanation is given regarding a processing procedure in the image processing system 100 of the present embodiment that is provided with a configuration as above. FIG. 3 is a flowchart representing a processing procedure in accordance with the image processing system of the first embodiment.

In step S110 (initialization processing), the information processing apparatus 1 reads internal parameters of the image capturing apparatus 180, and calculates an initial position and an initial orientation of the image capturing apparatus 180. The internal parameters of the image capturing apparatus 180 (a focal distance $f_x$ (the horizontal direction of the image) and $f_y$ (the vertical direction of the image), an image center position $c_x$ (the horizontal direction of the image) and $c_y$ (the vertical direction of the image), and a lens distortion parameter) are calibrated in advance in accordance with Zhang's method (Z. Zhang, "A flexible new technique for camera calibration," IEEE Trans. on Pattern Analysis and Machine Intelligence, vol. 22, no. 11, pp. 1330-1334, 2000. (D1)). In addition, the information processing apparatus 1 obtains the relative position/orientation (an external parameter) between the two cameras that configure the image capturing apparatus 180 which is a stereo camera as follows, for example. The information processing apparatus 1 obtains the position/orientation of each camera based on a patterns from images obtained by capturing a pattern that has a known three-dimensional shape by the left and right cameras at the same time. The information processing apparatus 1 obtains the relative position/orientation between the two cameras by converting the position/orientation of the right camera to a position/orientation based on the left camera. Initial values $t_{w \rightarrow t}$ (t=0), and $R_{w \rightarrow t}$ (t=0) of the position/orientation with respect to the world coordinate system of the image capturing apparatus 180 are calculated in accordance with, for example the method by Kato et al. (H. Kato and M. Billinghurst, "Marker tracking and hmd calibration for a video-based augmented reality conferencing system," International Workshop on Augmented Reality, 1999. (D2)) which uses synthetic markers that have a known size.

In step S120 (image input processing), the image input unit 110 is inputted with a stereoscopic image captured by the image capturing apparatus 180. In the present embodiment, because the image capturing apparatus 180 captures a color image, the image input unit 110 converts the inputted image to a grayscale image, and also uses the internal parameters of the left and right cameras to convert it to an image from which the influence of lens distortion is removed. In step S130 (feature point detection processing), the detection unit 120 detects a feature point on the image (the current frame) inputted by the image input unit 110. Detecting a feature point is possible by using the method by Shi et al. (J. Shi and C. Tomasi, Good Features to Track, Proc. CVPR1994. (D3)).

In step S140 (processing for associating feature points), the association unit 130 associates, in accordance with feature point matching, a feature point of the previous frame recorded in the availability information 141, and the feature point of the current frame detected in step S130. Note that, there may be cases below in which a feature point of a previous frame that is stored in the availability information 141 is referred to as a held feature point, and a feature point of the current frame that is detected in step S130 is referred to as a detected feature point. In the feature point matching, a normalized cross-correlation (SSD: sum of squared difference) of pixels around a detected feature point and a held feature point is calculated, and if a calculated value is less than or equal to a predetermined threshold value $M_{th}$, the two feature points are treated as feature points for the same position on the same object. In the present embodiment, being treated as the same position is referred to below as associating, and a feature point of the current frame that is associated with a feature point of the previous frame in accordance with association of feature points on an image is referred to as an associated feature point.

In step S150 (feature point selection processing), the selection unit 150 decides, based on the availability information 141 held by the hold unit 140, an associated feature point to use in the calculation of the position/orientation. The selection unit 150 selects an associated feature point that is associated with a held feature point for which the availability value is greater than a predetermined threshold value $V_{th}$. In this way, a feature point used in calculation of the position/orientation is selected from the plurality of detected feature points. In step S160 (position and orientation calculation processing), the calculation unit 160 uses the associated feature point selected in step S150 and the held feature point held by the hold unit 140 to calculate the position/orientation of the image capturing apparatus 180 that captured the current frame. As the position/orientation of the image capturing apparatus 180, the calculation unit 160 calculates $R_{(t-1)\to t}$ which is a 3×3 rotation matrix representing the orientation and $t_{(t-1)\to t}$ which is a three-dimensional vector representing the position of the image capturing apparatus 180 for the current frame with respect to the previous frame. Calculation of the position/orientation of the image capturing apparatus 180 is possible by using the method of Badino et al. (H. Badino and T. Kanade, "A Head-Wearable Short-Baseline Stereo System for the Simultaneous Estimation of Structure and Motion", Proc. MVA, 2011 (D4)), for example. In addition, the position/orientation $t_{w\to t}$, $R_{w\to t}$ of the image capturing apparatus 180 with respect to the world coordinate system is calculated by adding the position/orientation $t_{(t-1)\to t}$, $R_{(t-1)\to t}$ of the image capturing apparatus 180 with respect to the camera coordinates of the previous frame to the position/orientation $t_{w\to (t-1)}$, $R_{w\to (t-1)}$ of the image capturing apparatus 180 with respect to the world coordinate system calculated at the previous frame.

Figure 4:
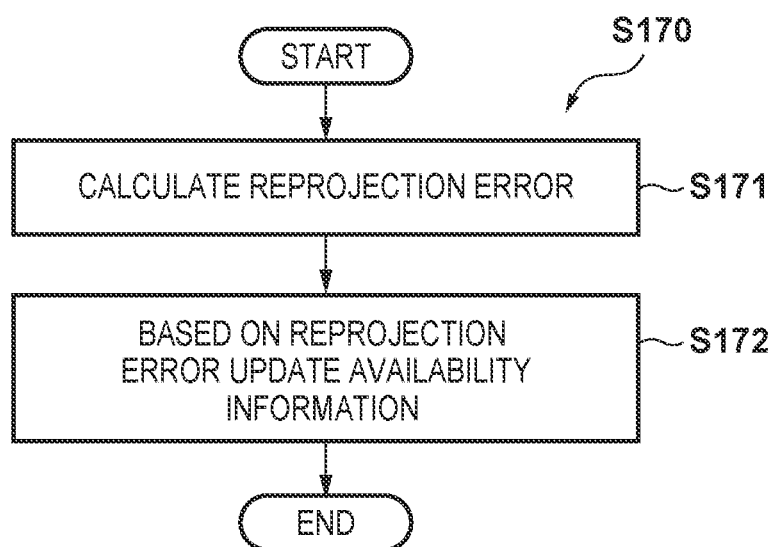
FIG. 4 is a flowchart illustrating a procedure for processing to update availability information.

In step S170 (process for updating availability information), the update unit 170 updates the availability information 141 held by the hold unit 140 (the history of positions of feature points of the previous frame), based on the position/orientation calculated in step S160. For the process for updating the availability information 141, explanation is given in detail with reference to the flowchart of FIG. 4. FIG. 4 is a flowchart illustrating a procedure for the process for updating the availability information in step S170.

In step S171, the update unit 170 uses the position of a feature point of the previous frame held by the hold unit 140 (a held feature point) and the position/orientation calculated in step S160 to calculate the position at which the held feature point is projected in the current frame (a projection point). More specifically, firstly the update unit 170 performs stereo matching by the left and right images of the stereo camera for the previous frame, and obtains a parallax between the left and right images for the held feature point. The update unit 170 uses the parallax and an external parameter of the camera to calculate a position D in the depth direction for the held feature point. The update unit 170 uses the depth D, internal parameters of the camera ($f_x$, $f_y$, $c_x$, and $c_y$), and image coordinates ($u_{t-1}$, $v_{t-1}$) of the held feature point which is a feature point of the previous frame to calculate, by Equation 1, three-dimensional coordinates ($X_{t-1}$, $Y_{t-1}$, $Z_{t-1}$) in the camera coordinate system of the previous frame for the held feature point.

$$\begin{bmatrix} X_{t-1} \\ Y_{t-1} \\ Z_{t-1} \end{bmatrix} = D \begin{bmatrix} (u_{t-1} - c_x)/f_x \\ (v_{t-1} - c_y)/f_y \\ 1 \end{bmatrix} \quad \text{[EQUATION 1]}$$

Next, the update unit 170 uses the position/orientation of the image capturing apparatus 180 for capturing the current frame with respect to the position of the image capturing apparatus 180 for capturing the previous frame ($t_{(t-1)\to t}$, $R_{(t-1)\to t}$) to calculate, by Equation 2, three-dimensional coordinates ($X_t$, $Y_t$, $Z_t$) for the held feature point in the camera coordinate system of the current frame.

$$\begin{bmatrix} X_t \\ Y_t \\ Z_t \\ 1 \end{bmatrix} = \begin{bmatrix} R_{(t-1)\to t} & t_{(t-1)\to t} \\ 0 & 1 \end{bmatrix} \begin{bmatrix} X_{t-1} \\ Y_{t-1} \\ Z_{t-1} \\ 1 \end{bmatrix} \quad \text{[EQUATION 2]}$$

Next, the update unit 170 converts, by Equation 3, the three-dimensional coordinates ($X_t$, $Y_t$, $Z_t$) of the held feature point in the camera coordinate system for the current frame to image coordinates (ut, vt) for the current frame.

$$\begin{bmatrix} u_t \\ v_t \end{bmatrix} = \begin{bmatrix} f_x X_t/Z_t + c_x \\ f_y Y_t/Z_t + c_y \end{bmatrix} \quad \text{[EQUATION 3]}$$

In the present embodiment, processing indicated by Equation 1 through Equation 3 is referred to as projection. In addition, the point for the projection position ($u_t$, $v_t$) on the current frame for the feature point of the previous frame is referred to as a projection point. Next, the update unit 170 calculates a two-dimensional Euclidean distance in the image coordinate between the associated feature point and the projection point (a distance between the projection position and the position of the associated feature point in the current frame). In the present embodiment, the calculated Euclidean distance is referred to as a reprojection error.

In step S172, the update unit 170 updates the availability information based on the reprojection error calculated step S171. Specifically, the update unit 170 updates the availability value so that an availability value $c_t$ of the current frame becomes the smaller of an availability value $c_{t-1}$ of the previous frame and an availability value $c_{calc}$ which is obtained from the reprojection error. In other words, the update unit 170 updates the availability value as indicated by Equation 4.

$$c_t = \min(c_{t-1}, c_{calc}) \quad \text{[EQUATION 4]}$$

Note that $c_{calc}$ is defined as in Equation 5.

$$c_{calc} = \begin{cases} \dfrac{d_{th}}{d + d_{th}} & (d < d_{th}) \\ 0 & (\text{otherwise}) \end{cases} \quad \text{[EQUATION 5]}$$

Where d is the reprojection error calculated in step S171, and $d_{th}$ is a predetermined threshold value for the reprojection error for setting the availability to 0. In addition, in step S171, the update unit 170 updates the geometric attributes of the feature point of the availability information 141 held by the hold unit 140 to be the position of the feature point in the current frame, for the calculation of the position/orientation in the next frame.

Returning to FIG. 3, in step S180 (image composition/display processing), the image composition unit 190 uses the position/orientation of the image capturing apparatus 180 that was calculated in step S160 to render a CG image of the virtual object. The image composition unit 190 then superimposes and composites the CG image on each image of the stereoscopic image obtained by the image capturing apparatus 180 and displays to the display unit 1100 of the HMD.

In step S190 (end determination processing), the information processing apparatus 1 determines whether to end the system. The system ends when a user has inputted a command for ending the system via a mouse, keyboard, or the like, and otherwise the processing returns to step S120, and the processing for measuring position/orientation is continued.

As described above, by the first embodiment, held features that are obtained from a first image captured by an image capturing apparatus at a first time and held are associated with detected features that are detected in a second image captured by the image capturing apparatus at a second time that is after the first time. Out of the associated detected features, one for which the corresponding availability of the held feature is high (greater than equal to a predetermined threshold value) is used for a calculation of the position/orientation of the image capturing apparatus. Accordingly, by appropriately setting the availability of the held feature, it is possible to calculate a more accurate position/orientation. Furthermore, by the first embodiment, the availability value is updated based on the reprojection error (more specifically, the availability value for a feature point having a large reprojection error is reduced). By using such availability information to select a feature point to use at a time of a position/orientation calculation, it is possible to stably and with high precision calculate the position/orientation, even in a scene where a moving object exists or in a scene in which there exists an object for which incorrect association of feature points repeatedly occurs due to its structure or the like.

<Variation 1-1>

Note that the image capturing apparatus 180, which captures images, is no limited to a stereo camera, and may be a camera that captures images of a physical space. For example, the image capturing apparatus 180 may be configured by a monocular camera, and may be configured by three or more cameras for which relative position/orientation is known beforehand. In addition, the image capturing apparatus 180 is not limited to a camera that captures a color image, and may be a camera that captures a grayscale image, or may be a camera that captures depth information. However, in the case of using a monocular camera, because depth is necessary when calculating a position/orientation and when calculating reprojection error, it is necessary to calculate the depth from movement of the camera by using the method of Klein et al. (G. Klein and D. Murray, "Parallel tracking and mapping for small AR workspaces," Proc. ISMAR, pp. 225-234, 2007 (D5)), for example. In addition, an image capturing apparatus for capturing an image for calculating a position/orientation and an image capturing apparatus for capturing an image to which CG is composited may be the same apparatus or may be different apparatuses.

<Variation 1-2>

A feature point was used for an image feature in the first embodiment, but there is no limitation to this, and an image feature may be something from which it is possible to calculate the position/orientation of the image capturing apparatus 180 from geometric information of an image. An edge in the image may be used as an image feature, as in the method of Kotake et al. (D. Kotake, K. Satoh, S. Uchiyama, and H. Yamamoto: "A fast initialization method for edge-based registration using an inclination constraint", Proc. ISMAR 2007 (D 6), for example. In such a case, the geometric attribute of an image feature held by the hold unit 140 may be two-dimensional positions of both end points of an edge on an image, for example. In addition, configuration may be taken to set the three-dimensional model of an object as an image feature, and use the method of Korkalo et al. (O. Korkalo, S. Kahn, "Real-time depth camera tracking with CAD models and ICP", JVRB, Vol. 13, No. 1, 2016 (D7)) for obtaining the position/orientation of the image capturing apparatus 180 by comparing the model and an input image. In addition, configuration may be taken to use a marker as an image feature instead of a three-dimensional model, and use the method of Kato et al. (D2) which is position and orientation estimation based on a marker.

<Variation 1-3>

In the first embodiment, a normalized cross-correlation associated with an image feature is used (step S140). However, a method that can be used in association of image features is not limited to this, and it is sufficient if a method can find an association relationship for feature points between images. Matching of SIFT feature amounts which is the method of Lowe (D. G. Lowe: "Distinctive Image Features from Scale-Invariant Keypoints", International Journal of Computer Vision, Vol. 60, pp. 91-110, 2004 (D8)) may be used, for example. In addition, the position of a feature point in a current frame may be calculated (tracked) directly from the feature point of a previous frame as in the method of Tomasi et al. (C. Tomasi and T. Kanade, "Detection and Tracking of Point Features", Carnegie Mellon University Technical Report CMU-CS-91-132, 1991 (D9)), for example.

<Variation 1-4>

In addition, in the first embodiment, a feature point for which the availability value is greater than or equal to a predetermined threshold value $V_{th}$ is selected as the feature point to use in the calculation of the position/orientation of the image capturing apparatus 180 (step S150). However, a method of selecting a feature point is not limited to this, and it is sufficient if a feature point having a large value for availability is selected. For example, configuration may be taken so that a predetermined number ($P_{max}$) are selected in order from one having a largest value for availability. In addition, configuration may be taken to select a feature point having an availability value larger than the value of an average value or a median value of values for availability of all feature points, for example.

<Variation 1-5>

In addition, in the first embodiment, that the availability value is greater than or equal to the predetermined threshold value $V_{th}$ is indicated as a condition for selecting a feature point to use in calculation of the position/orientation of the image capturing apparatus 180, but consideration is not given for geometric attributes (a position of the feature point). To improve the precision of calculation of a position/orientation, it is good if feature points are distributed so that a density on the current frame is uniform. Accordingly, configuration may be taken so as to separate the current frame into sub-regions in a grid, and select a predetermined number ($P_{max}$) of feature points in an order from one having a largest value for availability in each region, for example. In addition, configuration may be taken to select feature points in an order from a largest value for availability out of feature points having a distance on the image be greater than a predetermined threshold value, and feature points that are already selected, for example. In other words, configuration may be taken to select feature points in an order from a largest availability value, and so that a distance on the image is larger than the predetermined threshold value.

<Variation 1-6>

In the first embodiment, a feature point to use in a position/orientation calculation is selected from a plurality of detected feature points (associated feature points) based on the availability value, but configuration may be taken to add to each feature point a weight for calculation of position/orientation based on the value of availability instead of selecting a feature point to use. Specifically, the availability value may be used as a weight unchanged, and, alternatively, the weight may be defined as 0 if the availability value is less than or equal to a predetermined threshold value and defined as the availability value as is if the availability value is greater than the threshold value. In a calculation of position/orientation, the contribution to the calculation of the position/orientation of a feature point is adjusted and changed based on the weight added to each of the plurality of detected feature points (associated feature points).

<Variation 1-7>

In step S170 of the first embodiment, the availability value $c_t$ for the availability information at the time t is updated by the smaller value out of the availability value $c_{t-1}$ of the previous frame and the availability value $c_{calc}$ that is calculated based on the reprojection error obtained in step S171 (refer to Equation 4). However, a method for updating the value for availability is not limited to this, and it is sufficient if there is a method that realizes an update such that the value for availability is small if the reprojection error is large. For example, the value for availability may be updated by using a simple average value of the availability value $c_{calc}$ that is obtained from the reprojection error and the availability value $c_{t-1}$ of the previous frame. In addition, the value for availability may be updated by a weighted average of the availability value $c_{t-1}$ and the availability value $c_{calc}$. In addition, if the calculated availability value $c_{calc}$ is less than or equal to a predetermined threshold value, a value resulting from subtracting a predetermined value (for example, 0.1) from the availability value $c_{t-1}$ of the time t-1 in a range so that a result thereof does not fall below 0 may be set as the updated availability value $c_t$.

<Variation 1-8>

In step S172 of the first embodiment, the availability value $c_{calc}$ obtained from the reprojection error is calculated by using Equation 5, but there is no limitation to this. It is possible to apply any calculation method in which the availability value $c_{calc}$ decreases as the reprojection error increases. For example, $c_{calc}$ may be 1 if the reprojection error is greater than or equal to a predetermined threshold value, and 0 if the reprojection error is less than the threshold value. In addition, configuration may be taken to have $c_{calc}$ be a value resulting from dividing 1 by a value resulting from adding 1 to the reprojection error, for example. In addition, configuration may be taken to have $c_{calc}$ be a value that takes as an index a value resulting from taking Napier's constant as a floor and applying a negative sign to the reprojection error, for example.

<Variation 1-9>

In the first embodiment, the availability value was held as a real number value from 0 to 1, but it may be a binary or a quantized value. For example, when holding an availability value as binary, it is sufficient if the availability value is set to 0 when the reprojection error calculated in step S171 is greater than or equal to a predetermined threshold value and set to 1 when the reprojection error is less than the threshold value. In addition, when quantizing, for example configuration may be taken to define two predetermined threshold values, and assuming that the magnitude of the reprojection error is L and the two threshold values are A and B (A>B), define the availability value as 0 when L≥A, 0.5 when A>L≥B, and 1 when L<B.

<Variation 1-10>

In the first embodiment, the hold unit 140 holds the availability and geometric attributes of an image feature of a previous frame captured at the time t-1 as the availability information. However, a previous frame is not limited to the time t-1, and a history of a plurality of times may be held. In this case, the update unit 170 may update the availability information with reference to the history of the plurality of times. For example, as illustrated in Equation 6, the update unit 170 may update the availability value by using a weighted average of availability values calculated in a previous n frames.

$$c_t = \left(\sum_{i=1}^{n} \alpha_{t-i} c_{t-i}\right) + \alpha_t c_{calc} \qquad \text{[EQUATION 6]}$$

Note that $c_{t-i}$ is the availability value at a time t-i, and n is a value for how many pieces of history information back in the past to refer to. $\alpha_t$ is a value representing the weight of the availability information at the time t, and is a value that satisfies Equation 7.

$$\sum_{i=0}^{n} \alpha_t = 1 \qquad \text{[EQUATION 7]}$$

Note that a median value may be used instead of a weighted average of availability values calculated for previous frames. In addition, configuration may be taken to reduce the availability value if availability values calculated for n previous frames are consecutively less than or equal to a predetermined threshold value.

<Variation 1-11>

Figure 5:
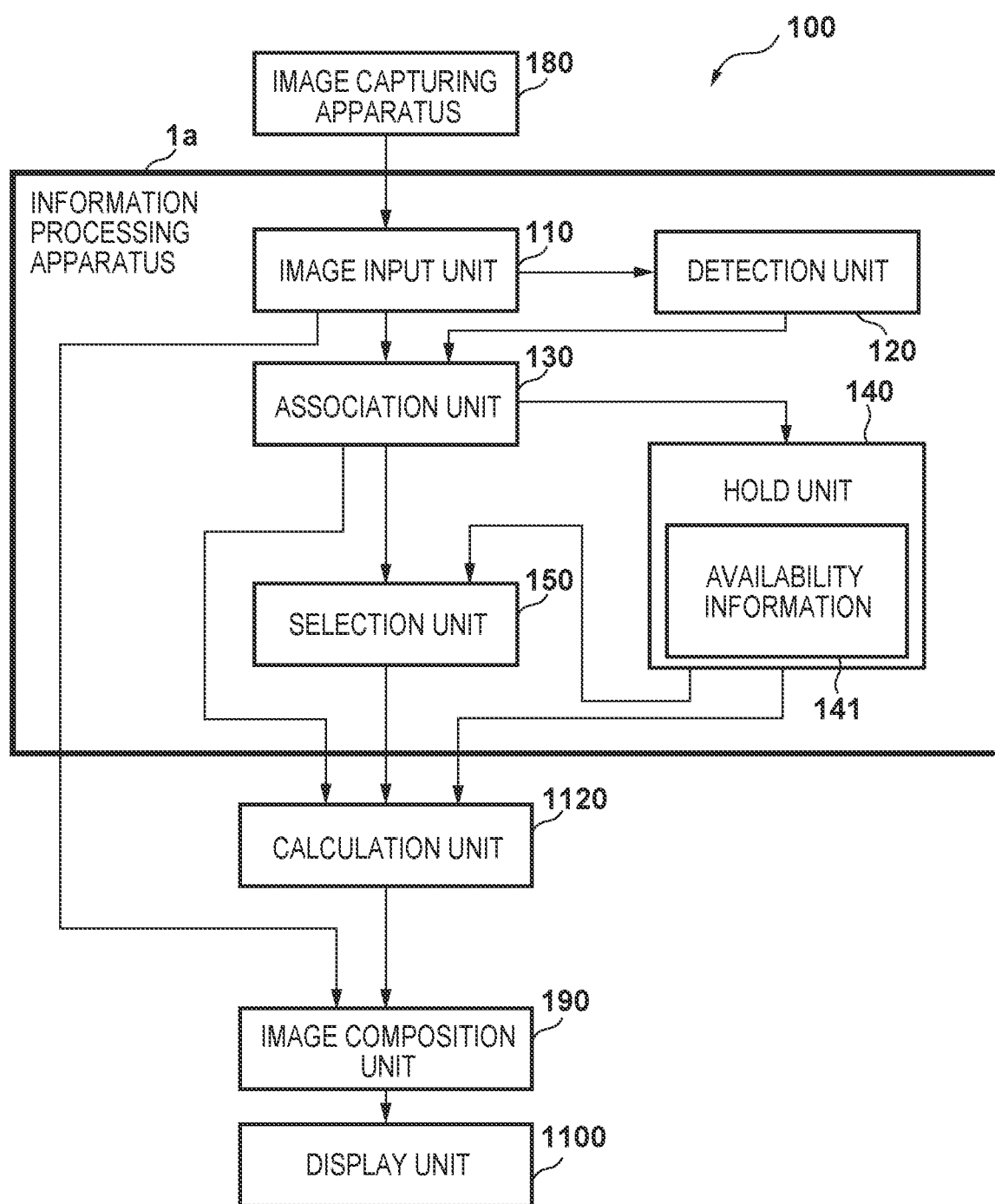
FIG. 5 is a block diagram illustrating a functional configuration of an information processing apparatus in a variation of first embodiment.
Figure 6:
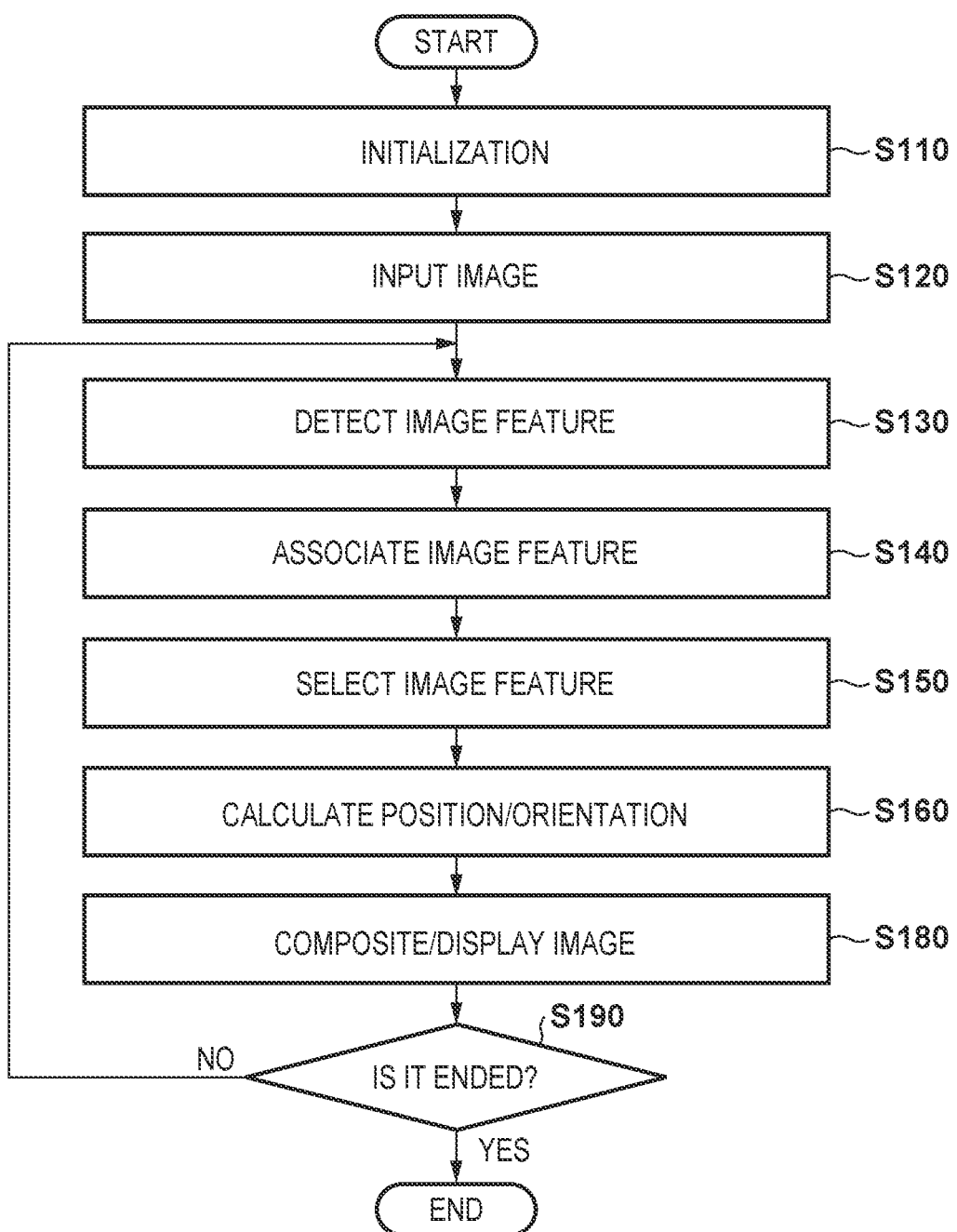
FIG. 6 is a flowchart illustrating a processing procedure of a variation of the first embodiment.

In the first embodiment, the availability information is updated based on a calculation result for position/orientation (based on the reprojection error). However, it is also possible to have a configuration in which updating of the availability information is not essential. With reference to FIG. 5 and FIG. 6, explanation is given below regarding a configuration of the image processing system 100 in which the availability information is not updated.

FIG. 5 is a block diagram illustrating an example of a configuration of the image processing system 100 in a variation. An information processing apparatus 1a has a configuration in which the calculation unit 160 and the update unit 170 are removed from the information processing apparatus 1 of FIG. 1. A calculation unit 1120 is connected to the exterior of the information processing apparatus 1a. The calculation unit 1120 calculates the position/orientation of the camera by using a feature point determined by the selection unit 150 of the information processing apparatus 1a to be usable in a calculation of the position/orientation of the image capturing apparatus 180. Note that the calculation unit 1120 may be incorporated in the information processing apparatus 1a.

FIG. 6 is a flowchart illustrating a procedure for processing by the image processing system 100. Differences with the procedure for processing by the information processing apparatus 1 of the first embodiment are as follows. Specifically, that the process for updating of step S170 is excluded, that the availability information is read in step S110 (initialization processing), and that the calculation unit 1120 which is connected to the exterior of the information processing apparatus 1a executes step S160 (position and orientation calculation processing). In step S110 (initialization), the hold unit 140 reads the availability information 141 from an external storage apparatus via an input unit (not shown), and holds it. In step S160, the calculation unit 1120 which is connected to the exterior of the information processing apparatus 1a calculates the position/orientation of the camera that captured the current frame. In this calculation of the position/orientation, an associated feature point selected by the selection unit 150 of the information processing apparatus 1a and a held feature point held by the hold unit 140 and associated by the association unit 130 are used.

A possibility of erroneous determination when updating the availability information is not zero. If an image feature on a moving object in a scene is known in advance, it is possible to remove the influence of erroneous determination in an update of the availability information by not updating the availability information, and it becomes possible to calculate the position/orientation with high precision. In such a case, updating of the availability information becomes unnecessary, and improvement of calculation speed is expected.

<Variation 1-12>

In the first embodiment, the availability information was updated so that a feature point on a moving object is not used in a position/orientation calculation. However, there are image features whose position changes despite not being a moving object, such as an image projected by a projector or an image appearing on a television screen. Accordingly, configuration may be taken to update the availability information so that an image feature whose position changes despite not being a moving object is not used in a position/orientation calculation. Specifically, information of a region in which an image feature whose position changes despite not being a moving object appears, such as a region projected by a projector or a television screen, (hereinafter, a region to be removed) is obtained in the initialization processing of step S110, and held by the hold unit 140, for example. Information indicating a region to be removed is recorded as a database in an external storage apparatus, for example, and the information processing apparatus 1 reads in this database and holds it in the hold unit 140. Alternatively, configuration may be taken to present a GUI on a display apparatus, and designate a region to be removed that is inputted by a user. For an image feature detected in the region to be removed, the update unit 170 causes a corresponding availability value of the hold unit 140 to be reduced.

<Variation 1-13>

A configuration for a user to set various threshold values that are used in the first embodiment may be provided. As threshold values that a user can set, for example:

the threshold value $M_{th}$ for determining whether to treat a feature point as the same in feature point association on an image (step S140);

the availability value threshold value $V_{th}$ for determining whether to use a feature point in a position/orientation calculation (step S150);

the threshold value $d_{th}$ for reprojection error when updating availability information (step S172); and the like may be given.

Figure 7:
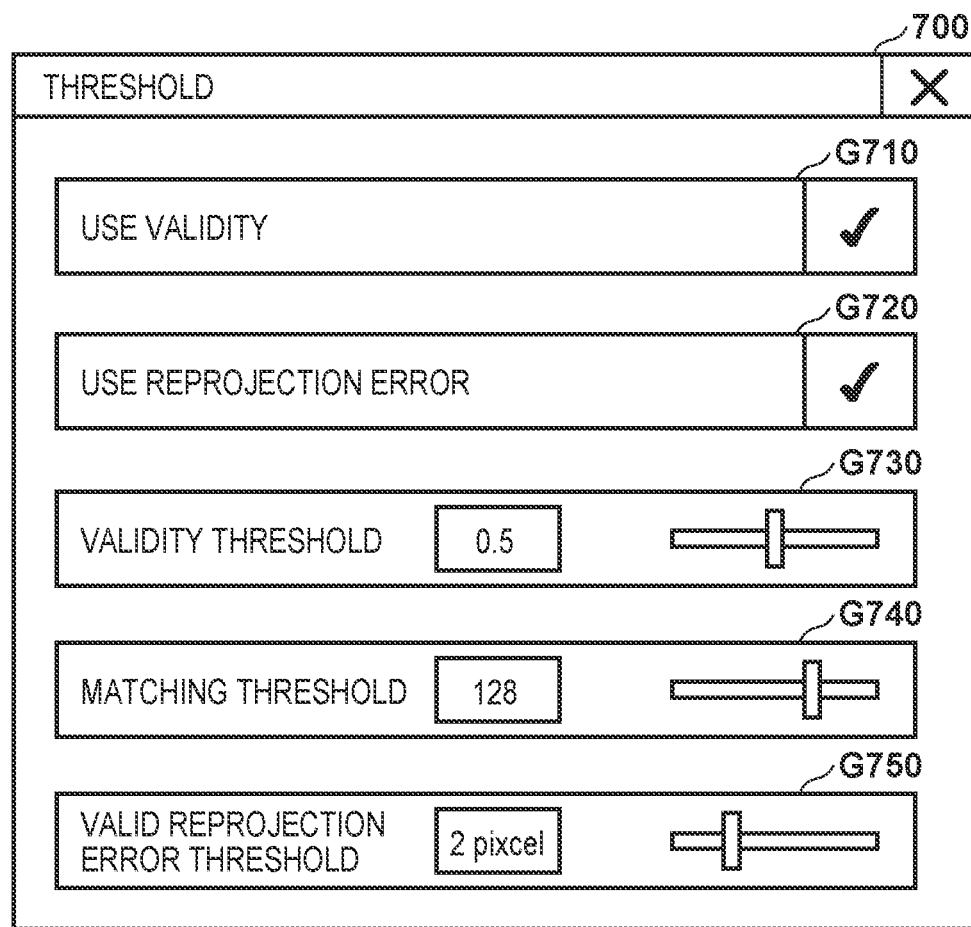
FIG. 7 is a view illustrating an example of a GUI for setting a threshold value.

Configuration may be taken such that a user is caused to set these threshold values via a predetermined GUI, and or the information processing apparatus 1 reads them from an external storage apparatus, for example in the initialization processing of step S110. Such a GUI may be realized by a display that the information processing apparatus 1 is provided with, for example. A display example of this GUI is illustrated in FIG. 7. A GUI 700 is an example of a GUI for changing various threshold values or switching whether or not the availability information is to be used. Specifically, the GUI 700 has a switching button G710 for switching whether or not to use availability information, and a switching button G720 for indicating whether or not to update availability information in accordance with a reprojection error. In addition, the GUI 700 has a slider G730 for setting the availability value threshold value $V_{th}$ for a feature point used in a calculation of position/orientation, a slider G740 for setting the threshold value $M_{th}$ for feature point matching, and a slider G750 for setting the threshold value $d_{th}$ for reprojection error. Upon detecting a press of a button (G710, G720) or change of a slider (G730, G740, G750) of the GUI, an execution state of the corresponding processing or the corresponding threshold value is caused to change.

<Variation 1-14>

In the present embodiment, explanation is given regarding a method for applying the information processing apparatus 1 in the present invention in a case of calculating a position and orientation of the HMD in order to realize a mixed reality. However, an application to which to the present invention is applied is not limited to an intended use for realizing a mixed reality. For example, application may also be made for a case of calculating the position/orientation of a moving robot in order to control the robot, or a case of calculating the position/orientation of an automobile for automated driving. In such cases, other moving robots or automobiles and pedestrians can be moving objects.

Furthermore, in a case where a type of a moving object is ascertained in advance, an object detection unit (not shown) may detect the moving object from an image inputted by the image input unit 110, and reduce the availability value of an image feature existing in the region thereof. Note that the object detection unit may detect the moving object by using an object detection learning model for determining the presence or absence of an object, for example. Specifically, the object detection learning model is a neural network from Shelhamer et al. (E. Shelhamer, J. Long and T. Darrell, "Fully Convolutional Networks for Semantic Segmentation", IEEE Transaction on Pattern Analysis and Machine Intelligence, Vol. 39, pp. 640-651, 2017 (D10)) that is learned by using deep learning so as to output, for each pixel in an inputted image, 1 if the pixel is included in the region of a moving object and 0 if the pixel is not included in the region of a moving object, for example. In addition, the object detection unit may detect, as a moving object, a region in which a normalized cross-correlation value for a time of template matching an input image with a template image extracted from an image of a moving object in advance and held in a storage unit (not shown) is less than or equal to a predetermined threshold value. Furthermore, configuration may be taken for an object detection unit to hold a three-dimensional model (CAD data for example) of a moving object (not shown), and detect as a moving object a region where an object appearing in an input image aligns with a CAD model in accordance with a Line2D method for performing alignment with a silhouette when observing a gradient image that is derived from the input image and the CAD data from various directions. By this, when the type of a moving object is ascertained in advance, an image feature on the moving object ceases to be used in the calculation of a position/orientation, and it is possible to stably and with high precision calculate the position/orientation.

Second Embodiment

In the first embodiment, configuration is such that, by reducing the availability value as the reprojection error for a feature point increases, a feature point having a high reprojection error is less likely to be used in a calculation of a position/orientation. In the second embodiment, the availability value is increased the more times associating feature points for a previous frame and a current frame has consecutively succeeded for a given feature point, and the availability value decreases for a feature point that fails at association. In this way, by selecting and using a feature point for which association has consecutively succeeded, it is possible to stably and with high precision calculate the position/orientation of the image capturing apparatus 180.

A configuration of the image processing system in the second embodiment is similar to that in the first embodiment (FIG. 1A and FIG. 1B). However, the availability information 141 held by the hold unit 140 differs between the first embodiment and the second embodiment. The availability information 141 of the second embodiment has information relating to the number of times each feature point was successfully associated (hereinafter, a consecutive association count), in addition to the availability value for a position and orientation calculation of each feature point, and the geometric attribute of each feature point that are explained in the first embodiment (FIG. 2). In the present embodiment, an integer value is used as the information relating to a consecutive association count. In addition, the processing procedure for the image processing system in the second embodiment is similar to that of the first embodiment (FIG. 3), except for step S140 (processing to associate feature points) and step S170 (process for updating availability information).

In step S140, the association unit 130 associates, in accordance with feature point matching, a feature point of the previous frame (a held feature point) and a feature point of the current frame (a detected feature point), similarly to in the first embodiment. In accordance with a result of this association processing, the association unit 130 updates the information relating to the consecutive association count of the availability information 141 held by the hold unit 140. In other words, the association unit 130 adds 1 to the value of the information relating to the consecutive association count if an association relationship was found, and sets the value of the information relating to the consecutive association count to 0 if an association relationship was not found.

In addition, in step S170, the update unit 170 updates the availability information 141 based on the consecutive association count for each held feature point that is held by the hold unit 140. Specifically, the update unit 170 makes the availability of a held feature point to be small the smaller the consecutive association count is. In the present embodiment, the availability of a held feature is set to 0 if the consecutive association count is less than or equal to a predetermined number of times. For example, the update unit 170 updates an availability value $c_t$ of the current frame as in Equation 8 if the consecutive association count is M.

$$c_t = \begin{cases} 0 & (M < M_{th}) \\ 1 & \text{(otherwise)} \end{cases} \quad \text{[EQUATION 8]}$$

Note that $M_{th}$ is a threshold value relating to a number of times that association must consecutively succeed after a feature point is detected and before it is used in a calculation of a position/orientation.

As described above, in the second embodiment, configuration is such that an image feature having a low consecutive association count is not used in the calculation of a position/orientation. By this, it is possible to stably and with high precision calculate a position/orientation without using in a position/orientation calculation an image feature newly detected on a moving object that approaches, for example.

<Variation 2-1>

In the second embodiment, an availability value is updated based on a consecutive association count which is a number of times that association succeeded for a feature point, but there is no limitation to this. For example, configuration may be taken so as to calculate a composite value, which combines an availability value calculated based on the consecutive association count and an availability value calculated based on the reprojection error that is calculated in the first embodiment, and use this composite value to select a feature point to use for a position/orientation calculation. In such a case, the availability information 141 holds an availability value cc calculated based on the consecutive association count, an availability value cp calculated based on the reprojection error, and a composite value c. In step S150, the selection unit 150 selects a feature point for which the composite value c is greater than or equal to a predetermined threshold value. Note that it is sufficient if the composite value c is a value that decreases as the consecutive association count decreases or the reprojection error increases. For example, a value that is the smaller out of the availability values cc and cp may be a composite value, and a value resulting from multiplying or adding cc and cp may be a composite value.

Third Embodiment

In the first embodiment, the greater the reprojection error is for a feature point, the less likely it is to be used in a position/orientation calculation as the availability of the feature point is caused to decrease. In addition, in the second embodiment, the lower the consecutive association count is for a feature point, the less likely it is to be used in a position/orientation calculation as the availability of the feature point is caused to decrease. In the third embodiment, if the reprojection error is consecutively less than a predetermined threshold value, the availability value is caused to increase even for a feature point whose availability value has been reduced. In other words, the availability related to a held feature whose value for reprojection error is consecutively smaller than the predetermined threshold value over a predetermined number of times or more is increased. By this, it is possible to cause an availability value that has first been reduced to increase, and it is possible to calculate a position/orientation with high precision and high stability, even when a moving object is stationary. Note that a moving object in the third embodiment being stationary is a phenomenon that occurs when movement is caused such as changing the layout of furniture such as a desk or a chair during a mixed reality experience, or a case where another automobile that was moving parks and becomes stationary in automated driving.

A configuration of the image processing system 100 in the third embodiment is similar to that in the first embodiment (FIG. 1A and FIG. 1B). However the availability information 141 held by the hold unit 140 differs between the first embodiment and the third embodiment. The availability information 141 of the third embodiment holds information relating to a number of times (hereinafter, a consecutive match count) that the reprojection error has been consecutively less than a predetermined threshold value, in addition to the availability and the geometric attribute indicated in FIG. 2.

The processing procedure for the image processing system of the third embodiment is the same as the processing procedure explained by the first embodiment (FIG. 3) except for step S170 (process for updating the availability information). In step S170 for the third embodiment, consideration is given to the consecutive match count in addition to the processing explained in the first embodiment (updating of the availability value based on the reprojection error). In step S172, the update unit 170 updates the consecutive match count included in the availability information 141 based on the reprojection error of each feature point. For example, the update unit 170 sets the availability value to 0 if the updated consecutive match count is less than a predetermined threshold value, and updates the availability value in accordance with the reprojection error if the updated consecutive match count is greater than or equal to the predetermined threshold value. More specifically, the update unit 170 adds 1 to the consecutive match count if the reprojection error is less than the predetermined threshold value $d_{th}$, and sets the consecutive match count to 0 if the reprojection error is greater than or equal to the threshold value $d_{th}$. The update unit 170 sets an availability value c to 0 if the consecutive match count is less than a threshold value, and updates the availability value c as in Equation 9 by using a reprojection error value d if the consecutive match count is greater than or equal to the threshold value.

$$c = \frac{d_{th}}{d + d_{th}}$$ [EQUATION 9]

As described above, in the third embodiment, even for a feature point whose availability value was first decreased, if a reprojection error of the feature point is small for a plurality of times, the value of the availability information of the feature point is increased. By this, if an object that was moving becomes stationary for example, it becomes possible to also use a feature point on this object in a position/orientation calculation, and it is possible to stably and with high precision calculate the position/orientation.

<Variation 3-1>

In the third embodiment, the availability information is updated as in Equation 9 if the consecutive match count is greater than or equal to a threshold value. However, there is no limitation to this, and it is sufficient if updating of the availability information is by a method that increases the availability when the consecutive match count is greater than or equal to a threshold value. For example, configuration may be taken to add a predetermined real number value (for example 0.1) to an availability value of the previous frame in a range where the availability value does not exceed 1. Alternatively, configuration may be taken to have a value resulting from dividing 1 by a value resulting from adding 1 to the reprojection error d (c=1/(d+1)), or to have d=1 when the reprojection error is greater than or equal to a predetermined threshold value and have d=0 if the reprojection error is less than the threshold value.

<Variation 3-2>

In the third embodiment, the availability value is calculated based on the consecutive match count. However, the availability value may be calculated based on a consecutive matching time instead of the consecutive match count. Specifically, configuration may be taken to decrease the availability value if the corresponding reprojection error of the feature point is less than a predetermined threshold value for time. By this, if an object that was moving becomes stationary for a certain amount of time, it becomes possible to also use a feature point on this object in a position/orientation calculation, and it is possible to stably and with high precision calculate the position/orientation.

Fourth Embodiment

In the first embodiment through the third embodiment, the position/orientation of a camera with respect to the world coordinate system of the current frame is calculated by adding the position/orientation of the camera for the current frame with respect to the previous frame to the position/orientation of the camera for the previous frame with respect to the world coordinate system. Accordingly, there is a possibility that an accumulation error will occur in a position/orientation as time elapses. In the fourth embodiment, a three-dimensional map that is an index for a calculation of a position/orientation in a scene where a moving object exists is generated, and a position/orientation with respect to this map is calculated based on an association relationship between a feature point in the current frame and the generated three-dimensional map. In such a case, the position/orientation of the camera is calculated stably and with high precision by not using a feature point in the current frame in a calculation of a position/orientation if an availability value of the feature point is smaller than a predetermined threshold value. In addition, by not adding a feature point whose availability value is less than the predetermined threshold value to the three-dimensional map when generating the three-dimensional map, a feature point on a moving object is prevented from being added to the three-dimensional map, and the position/orientation of the camera is calculated stably and with high precision.

Figure 8:
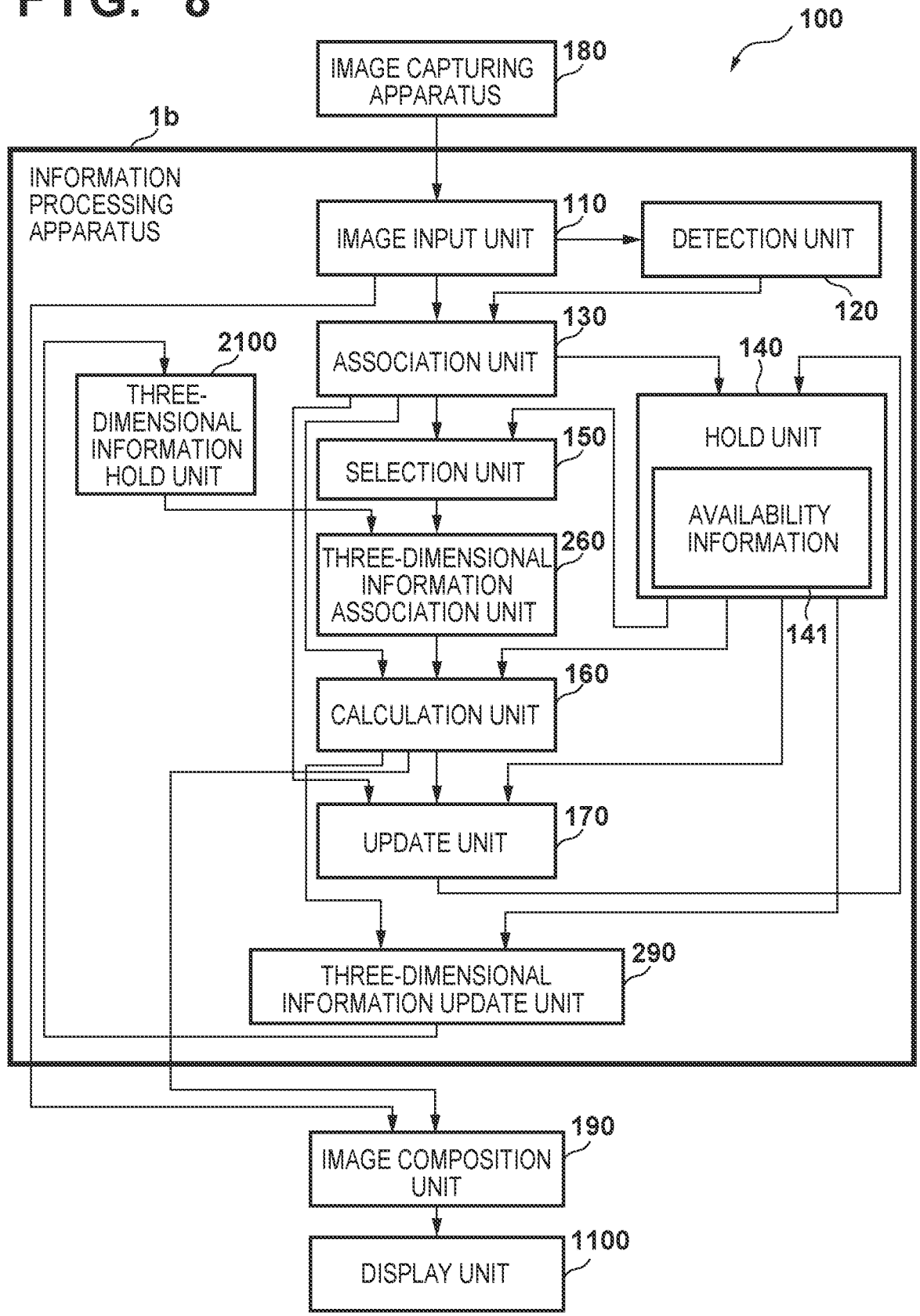
FIG. 8 is a block diagram illustrating an example of a functional configuration of an information processing apparatus in a fourth embodiment.

FIG. 8 is a block diagram illustrating an example of a configuration of the image processing system 100 in the fourth embodiment. The same reference numerals are added to configurations that are the same as in the first embodiment (FIG. 1A and FIG. 1B). In the fourth embodiment, a three-dimensional information association unit 260, a three-dimensional information update unit 290, and a three-dimensional information hold unit 2100 are added to the information processing apparatus 1 of the first embodiment.

The three-dimensional information hold unit 2100 holds a three-dimensional map. The three-dimensional map includes three-dimensional geometric information of a feature that exists in a scene. In the present embodiment, the three-dimensional map holds a three-dimensional vector ($X_{map}$, $Y_{map}$, and $Z_{map}$) representing positions of a feature point (a map point) in a world coordinate system, and pixel values (for example, 30 pixels in vertical and horizontal directions) for a sub-region around the feature point on the input image at the time when the feature point was detected. The three-dimensional information association unit 260 searches for an association relationship between a feature point in the current frame that is selected by the selection unit 150, and a map point held by the three-dimensional information hold unit 2100. The three-dimensional information update unit 290 adds the feature point of the current frame to the three-dimensional map held by the three-dimensional information hold unit 2100, based on the availability information held by the hold unit 140, and the position/orientation calculated by the calculation unit 160.

Figure 9:
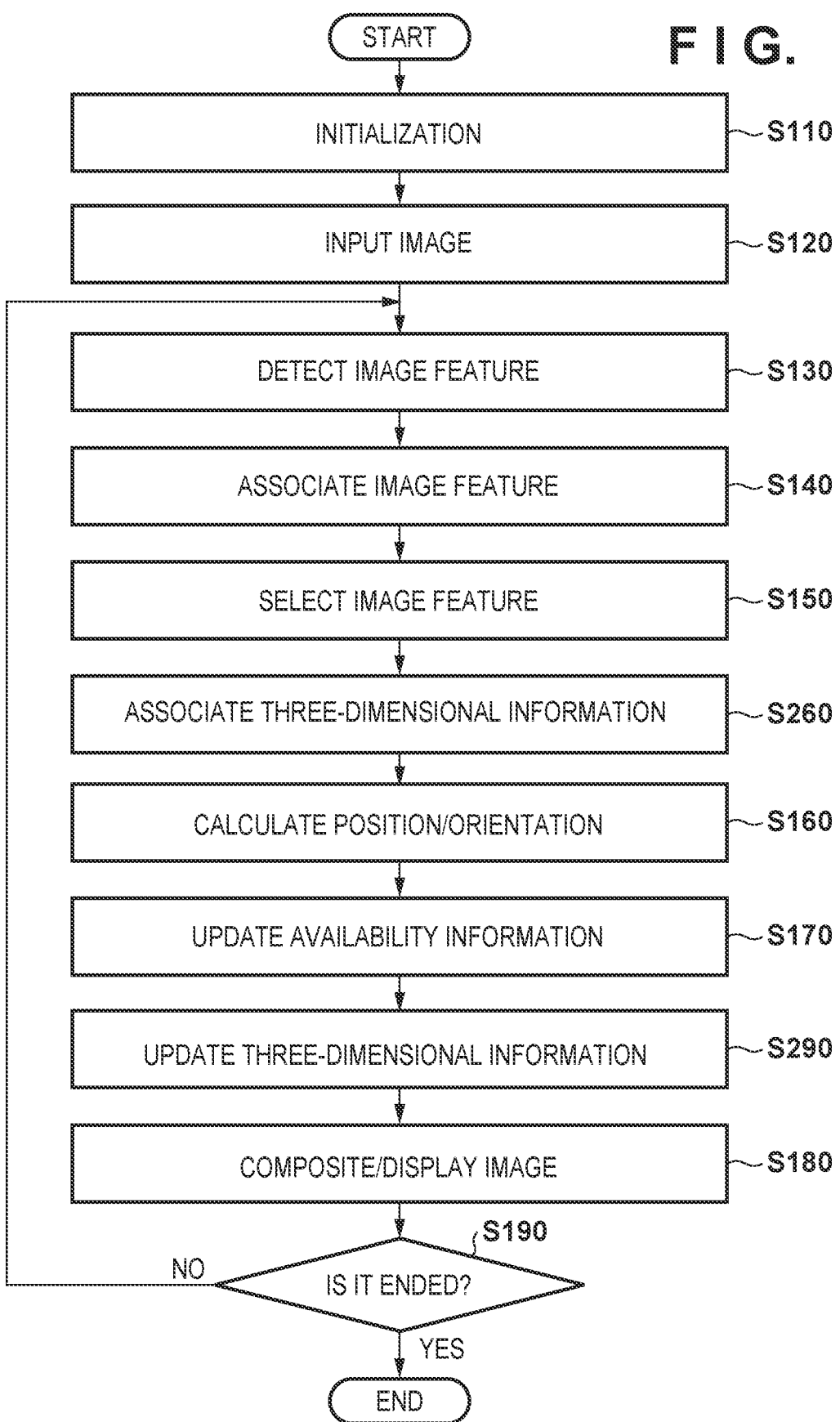
FIG. 9 is a flowchart illustrating a procedure for processing in the fourth embodiment.

FIG. 9 is a flowchart illustrating a procedure for processing in the fourth embodiment. The same step numerals are added to processing that is the same as that in the first embodiment (FIG. 3). Processing different between the first embodiment and the fourth embodiment is step S260 (three-dimensional information association processing) and step S290 (three-dimensional information update processing). Explanation is given below regarding step S260 and step S290.

In step S260, the three-dimensional information association unit 260 projects, by the position/orientation of the previous frame, the map point in the three-dimensional map held by the three-dimensional information hold unit 2100. Next, the three-dimensional information association unit 260 associates the feature point of the previous frame and the projected map point, in accordance with feature point matching. The three-dimensional information association unit 260 replaces the position of the associated feature point of the previous frame with the position of the projected map point. More specifically, firstly three-dimensional coordinates of the map point (the projected map point) on the image of the previous frame are calculated in accordance with Equation 10, based on the position/orientation of the camera for the previous frame with respect to the world coordinate system, and three-dimensional position of the map point. Note that, in Equation 10, the three-dimensional position of the map point is given as ($X_{map}$, $Y_{map}$, and $Z_{map}$), and the position/orientation of the camera for the previous frame with respect to the world coordinate system is given as ($t_{w \to (t-1)}$, $R_{W \to (t-1)}$). In addition, the three-dimensional coordinates of the map point (the projected map point) on the image of the previous frame are given as ($X_{map(t-1)}$, $Y_{map(t-1)}$, $Z_{map(t-1)}$).

$$\begin{bmatrix} X_{map(t-1)} \\ Y_{map(t-1)} \\ Z_{map(t-1)} \\ 1 \end{bmatrix} = \begin{bmatrix} R_{w \to (t-1)} & t_{w \to (t-1)} \\ 0 & 1 \end{bmatrix} \begin{bmatrix} X_{map} \\ Y_{map} \\ Z_{map} \\ 1 \end{bmatrix} \quad \text{[EQUATION 10]}$$

Next, the three-dimensional coordinates ($X_{map(t-1)}$, $Y_{map(t-1)}$, $Z_{map(t-1)}$) of the feature point in the camera coordinate system of the previous frame are converted, in accordance with Equation 11, to image coordinates of the previous frame ($u_{map(t-1)}$, $v_{map(t-1)}$).

$$\begin{bmatrix} u_{map(t-1)} \\ v_{map(t-1)} \end{bmatrix} = \begin{bmatrix} f_x X_{map(t-1)} / Z_{map(t-1)} + c_x \\ f_y Y_{map(t-1)} / Z_{map(t-1)} + c_y \end{bmatrix} \quad \text{[EQUATION 11]}$$

A map point projected as described above is referred to below as a projection map point. Next, the three-dimensional information association unit 260 associates the projection map point and a feature point on the previous frame by feature point matching. For example, the three-dimensional information association unit 260 calculates a normalized cross-correlation (SSD) for pixels around the feature point of the previous frame and the projection map point when a two-dimensional Euclidean distance between the projection map point and the feature point of the previous frame is less than or equal to a predetermined threshold value. If the calculated SSD value is less than or equal to a threshold value, the three-dimensional information association unit 260 associates by treating the projection map point and the feature point of the previous frame to be the same position on the same object. The three-dimensional information association unit 260 replaces the position of the associated feature point of the previous frame with the position of projection map point. In step S160, the calculation unit 160 calculates the position/orientation of the image capturing apparatus 180 by using the position of the feature point after the replacing.

In step S290 (three-dimensional information update processing), the three-dimensional information update unit 290 registers, in the three-dimensional map held by the three-dimensional information hold unit 2100, the feature point of the current frame based on the availability information and the position/orientation of the image capturing apparatus 180 calculated in step S160. Specifically, firstly the three-dimensional information update unit 290 selects an associated feature point whose availability value is greater than a predetermined threshold value, and registers the selected feature point in the map in accordance with the method of Klein et al. (D5), for example.

As described above, in the fourth embodiment, it is possible to calculate a position/orientation with high precision and high stability because the position/orientation is calculated by associating a map point registered in the three-dimensional map and a feature point selected based on availability information. It is possible to prevent error of a position/orientation from being accumulated because the position/orientation is calculated based on a three-dimensional map. Furthermore, by virtue of the fourth embodiment, a feature point to register in the three-dimensional map is selected by using availability information. Accordingly, registering in the map a feature point detected on a moving object or the like is prevented, and it is possible to stably and with high precision calculate a position/orientation.

<Variation 4-1>

In the fourth embodiment, the position/orientation of a camera is calculated by using two relationships: an associated feature point between a previous frame and the current frame, and an associated map point for a feature point of the previous frame and a projection map point. In addition, in the first embodiment, the position/orientation is calculated from the relationship between the associated feature point of the current frame and the feature point of a previous frame. However, there is no limitation to these approaches, and configuration may be taken to calculate a position/orientation by using only a relationship between an associated feature point of the current frame and a map point, as in the method of Klein et al. (D5). Specifically, configuration may be taken such that a position/orientation is calculated in accordance with an associated feature point of the current frame and a projection map point, by excluding a feature point of the previous frame for which an association relationship with a projection map point was not found in step S260.

Other Embodiments

In each embodiment described above, explanation is given of examples of applying the present invention to measurement of the position/orientation of an image capturing apparatus (a camera) in a physical space for use in alignment between the physical space and a virtual object in a mixed reality system, but there is no limitation to this. For example, the present invention can be applied to a case of performing three-dimensional modeling of an object or a space, a case of performing self-position estimation of a robot or an automobile, or the like, in a scene where a moving object is included.

As explained above, in the first embodiment, by reducing the availability value of a feature point having a large reprojection error, the feature point is less likely to be used in a position/orientation calculation. By using such availability information to select a feature point to use at a time of a position/orientation calculation, it is possible to stably and with high precision calculate the position/orientation, even in a scene where a moving object exists or in a scene in which there exists an object for which incorrect association of feature points repeatedly occurs due to its structure or the like.

In the second embodiment, the availability value is increased the more times associating feature points for a previous frame and a current frame has consecutively succeeded for a given feature point, and the availability value is reduced for a feature point that fails at association. In this way, it is possible to stably and with high precision calculate a position/orientation by selecting and using a feature point that has consecutively succeeded at association and has been consecutively used in position/orientation calculations in the past.

As described above, in the third embodiment, even for an image feature whose availability information value was first decreased, if a reprojection error thereof is small in a plurality of times, the value of the availability information thereof is increased. By this, if an object that was moving becomes stationary for example, it becomes possible to also use a feature point on this object in a position/orientation calculation, and it is possible to stably and with high precision calculate the position/orientation.

Furthermore, in the fourth embodiment, it is possible to calculate a position/orientation with high precision and high stability because the position/orientation is calculated by associating a map point registered in the three-dimensional map and a feature point selected based on availability information. Furthermore, by using availability information to select a feature point to register in the three-dimensional map, a feature point detected on a moving object or the like is prevented from being registered in the map, and it is possible to stably and with high precision calculate a position/orientation.

Note that, in each embodiment described above, a stereo camera is used as the image input unit 110, but there is no limitation to this, and it is sufficient to have something for inputting an image that captures a physical space. For example, an image captured by a monocular camera may be inputted, and a plurality of camera images such as with a stereo camera may be inputted. In addition, there is no limitation to input of a color image, and a grayscale image may be inputted, and a depth image representing depth information may be inputted. Furthermore, an image captured by a camera may be directly inputted, and may be inputted via a network.

The detection unit 120 is given as something that detects a feature point as an image feature, but there is no limitation to this, and it may be something for detecting an image feature for use in calculation of a position/orientation. For example, it may detect a feature point in accordance with the method of Shi et al. (D3), and may detect an edge by the method of Kotake et al. (D6). Alternatively, it may detect a marker by the method of Kato et al. (D2).

It is sufficient if the association unit 130 can search for an association relationship for whether image features across images are the same. For example, association may be performed based on a normalized cross-correlation of images for a sub-region around an image feature, and association may be performed by using Lowe's method (D8) of feature point matching that uses SIFT feature amounts. In addition, the feature point tracking that using KLT of Tomasi et al. (D9) may be used.

It is sufficient if the hold unit 140 is something that holds a history of information relating to a geometric attribute for specifying an orientation or a position of an image feature, and availability information that represents whether each image feature should be used in a calculation of the position/orientation of an image capturing apparatus. For example, the availability value may be binary, and may be a real number. In addition, a plurality of availability values may be held. In addition, a geometric attribute and availability information may be for one time in the past, or may be for a plurality of times. Furthermore, apart from a history of geometric attributes and availability, a history such as a number of times that association of an image feature has consecutively succeeded or a number of times that a reprojection error has been consecutively less than a predetermined threshold value may be held.

It is sufficient if the selection unit 150 is something that selects a feature point to use in a position/orientation calculation by using the availability information 141 held by the hold unit 140. For example, it may select a feature point whose availability value is greater than or equal to a predetermined threshold value, and may select a predetermined number of feature points in order from one whose availability value is largest. In addition, it may add a weight, which is a contribution for each feature point at a time of a position/orientation calculation, based on a value of the availability information.

It is sufficient if the calculation unit 160 is something for calculating the position/orientation of the image capturing apparatus 180 by using a feature point selected by the selection unit 150. Calculation of the position/orientation is possible by using the method of Badino et al. (H. Badino and T. Kanade, "A Head-Wearable Short-Baseline Stereo System for the Simultaneous Estimation of Structure and Motion", Proc. MVA, 2011 (D4)), the method of Kotake et al. (D6), the method of Korkalo et al. (D7), or the method of Kato et al. (D2), for example. In addition, when a weight is added to each feature point, the position/orientation may be calculated in accordance with the contribution of each feature point to the calculation of the position/orientation that is based on the weight.

It is sufficient if the update unit 170 is something for updating the value of the availability of a feature point for a position/orientation calculation. For example, the update unit 170 may update an availability value based on a reprojection error, and may update an availability value based on a number of times that association of an image feature has consecutively succeeded or a number of times that the reprojection error has been consecutively less than a predetermined threshold value. Furthermore, it may update a plurality of pieces of availability information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-001435, filed Jan. 6, 2017 and 2017-215899, filed Nov. 8, 2017 which are hereby incorporated by reference herein in their entirety.

What is claimed is:

1. An information processing apparatus comprising:
at least one memory storing a program; and
one or more processors which, by executing the program, function as:
a recognition unit configured to recognize a moving object included in an image captured by an image capturing apparatus by inputting the image to a learning model for determining a type of an object; and
a first determining unit configured to determine, based on a result of the recognition unit, an availability for a position calculation of the image capturing apparatus corresponding to a feature point indicating the moving object among feature points detected from the image, and determine the availability corresponding to a feature point indicating an object that is not the moving object among the detected feature points.

2. The information processing apparatus according to claim 1, wherein the first determining unit reduces the availability corresponding to a feature point indicating the moving object.

3. The information processing apparatus according to claim 2, wherein the feature point is a point representing a geometric structure in the image, and
the at least one processor further function as a second determining unit configured to determine a position of a feature point detected from the image by associating the feature point detected from the image with a feature point detected from another image captured before the image.

4. The information processing apparatus according to claim 3, wherein the at least one processor further function as a calculating unit configured to calculate a position of the image capturing apparatus based on a position of the feature point, determined by the second determining unit, selected based on the availability determined by the first determining unit.

5. The information processing apparatus according to claim 4, wherein the calculating unit calculates the position of the image capturing apparatus based on the position of the feature point whose availability is larger than a predetermined threshold value.

6. The information processing apparatus according to claim 4, wherein the calculating unit calculates the position of the image capturing apparatus based on the positions of a predetermined number of feature points determined by the second determining unit, wherein the predetermined number of feature points are selected in descending order of the determined availability from among the feature points.

7. The information processing apparatus according to claim 4, wherein the calculating unit divides the image into regions, and for each of the regions, the calculating unit selects a predetermined number of feature points in descending order of the availability, and calculates a position of the image capturing apparatus based on positions of the selected feature points determined by the second determining unit.

8. The information processing apparatus according to claim 4, wherein the calculating unit calculates a position of a head mount display including the image capturing apparatus.

9. The information processing apparatus according to claim 4, wherein the calculating unit calculates a position of a robot including the image capturing apparatus.

10. The information processing apparatus according to claim 1, wherein the moving object is a person.

* * * * *